April 25, 1961  C. L. RUNDELL  2,981,825
CONTACT TIP FOR WELDING GUN
Filed July 14, 1959
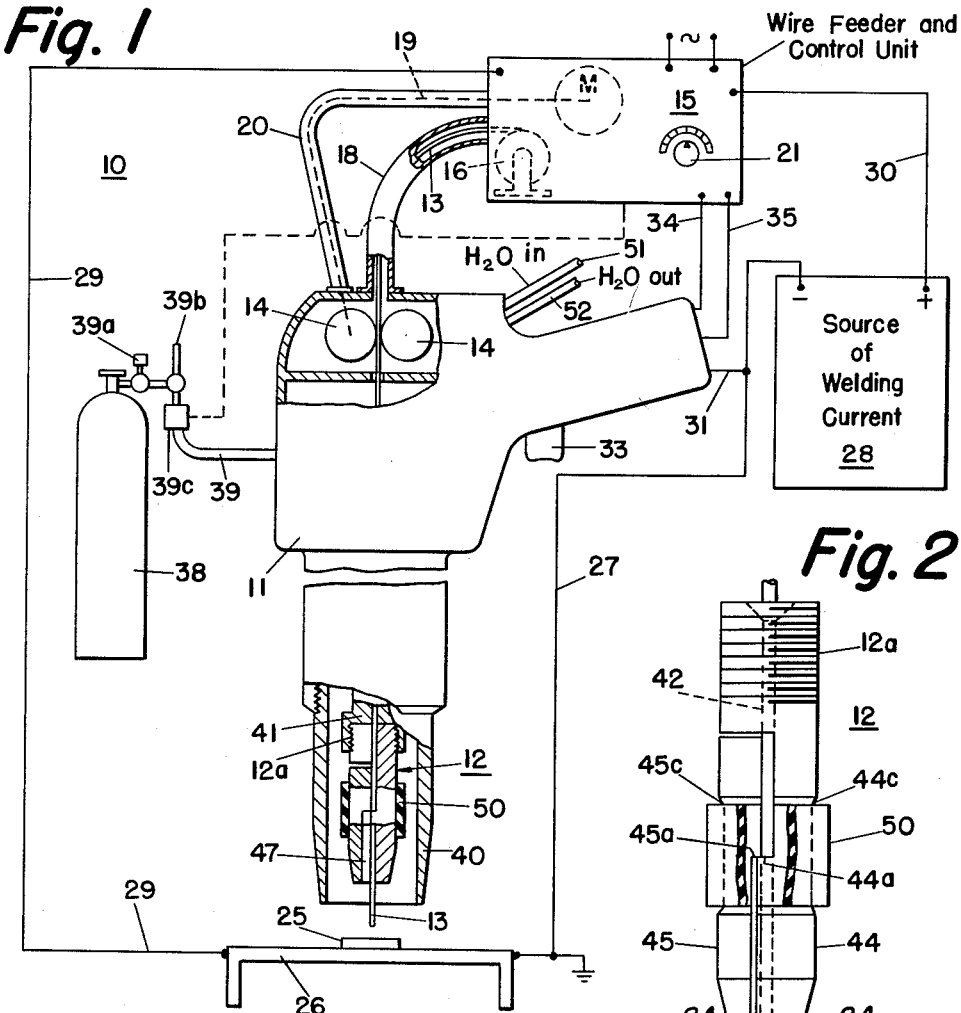
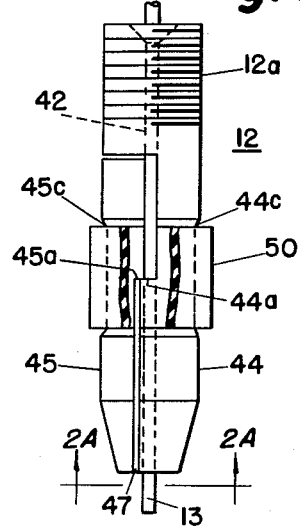
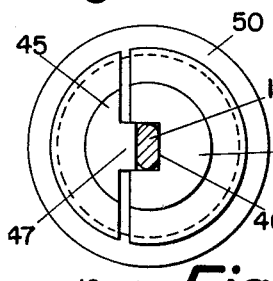
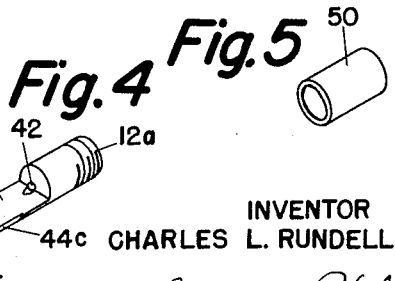
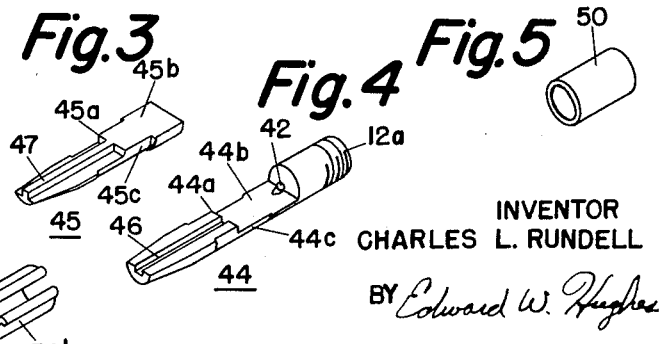
INVENTOR
CHARLES L. RUNDELL
BY Edward W. Hughes
ATTORNEY

2,981,825
CONTACT TIP FOR WELDING GUN

Charles L. Rundell, Chatham, N.Y., assignor to General Electric Company, a corporation of New York Filed July 14, 1959, Ser. No. 827,086

8 Claims. (Cl. 219—136)

This invention relates to consumable electrode gas-shielded arc welding and has for an object the provision of an improved contact tip for an electric arc welding gun which insures a substantial area of electrical contact between the consumable electrode and the contact tip to avoid fusing of the electrode within the tip when welding at high current densities.

It is a further object of the invention to provide an expandable contact tip for use with flat aluminum and magnesium welding wire in manner such that the occurrence of "burnback" is substantially eliminated. Burnback is defined as arcing to the tip and requires immediate shutdown of the welding apparatus.

In semi-automatic consumable electrode gas-shielded welding for aluminum, magnesium and the like, the electrode consists of bare aluminum or magnesium wire in coil form having a diameter in the range of about 0.020 to 0.125 inch which is fed mechanically into a hand gun for manual welding at feeding speeds up to about one thousand inches per minute and at high current densities. Heretofore it has been the practice to use round wire electrodes with the contact tips on the guns having corresponding round openings therethrough for passage of the round electrode wire. When using round wire as the electrode, the contact between the wire electrode and the contact tip is usually "point contact" and at most is only "line contact." In order to maintain as good contact as possible with round wire, it has been the practice to keep the opening through the contact tip as close as possible to the outside diameter of the wire while still permitting the wire to pass freely through the tip. The openings through the contact tips soon become enlarged and out of shape due to wear by the electrode wire passing through them and frequently the feed rollers damage or distort the shape of the wire. This decreases the area of contact between the electrode wire and the tip and when the maximum current density for the electrode is exceeded, fusing occurs between the electrode and the contact tip which requires stoppage of the welding equipment and replacement of the contact tip.

It has been the practice to use low-voltage generators (20–30 volts D.C.) in which the current flow (100–300 amperes) automatically regulates itself to burn off whatever amount of wire is being fed into the arc. As a result, the generator produces a current making the burnoff rate of wire equal to the feed speed. The round wire is usually fed by a pair of rotating rollers and by reason of the poor gripping action (point contact) between the feed rolls of the welding equipment and the round wire, it is extremely difficult to feed the wire at the required speed. When slippage occurs between the round wire electrode and the feed wheels, the generator produces a current corresponding to the speed of the feed wheels rather than the feed speed of the wire electrode. This produces a burnoff rate of the wire greater than the feed speed of the wire which results in burnback. When the tip jams due to burnback or fusing of the wire to the tip, the feed motor continues to operate causing the welding wire to be physically jammed into the welding gun requiring stoppage of the welding equipment and replacement of the contact tip. Such slippage and jamming damaged the wire, i.e. made it out-of-round, and thus required the damaged wire to be discarded.

The present invention utilizes flat wire electrodes and has substantially entirely eliminated burnback. The flat wire provides a better gripping surface for the feed rolls and is fed more uniformly than is possible with round wire. The expandable contact tip which accommodates the flat wire electrode provides a substantial "area contact," rather than point contact, between the contact tip and the electrode wire improving the current "pickup," thus eliminating one of the causes of pulsating arc that heretofore frequently resulted in poor welds.

The present invention enables a substantial reduction in welding costs to be obtained through minimized contact tip scrap, improved welds, less rework, and decreased shut-down time for equipment maintenance and repair. Heretofore, when round wire was employed for aluminum and magnesium welding, it was necessary to follow strict handling and storage requirements in order to prevent the wire from being flattened or otherwise damaged. By using flat wire not only is the original cost of the wire decreased by approximately forty percent but the strict wire handling and storage requirements may be relaxed to a substantial degree.

In accordance with the present invention there is provided an improved contact tip for an arc welding gun. The contact tip includes a front portion and a rear portion disposed axially of the tip with the rear portion having a central opening extending axially therethrough for the passage of a flat wire electrode. In one form, the rear portion is provided with threads on the external surface so that it may be readily connected to an adaptor on the contact of the welding gun. The front portion of the contact tip is divided axially thereof into two sections, one of which is movable radially relative to the other. One of the sections is provided with a groove in the surface thereof extending axially from the front end thereof and in alignment with the opening in the rear portion to receive the wire electrode. The bottom surface of the groove is flat throughout its length to engage the corresponding flat surface of the wire electrode. The other of the sections of the front portion is provided with structure dimensioned correspondingly with the groove and adapted to cooperate therewith to maintain the flat wire in the groove. In the preferred form of the invention the structure is in the form of a tongue which is adapted to extend into the groove to prevent wire wobble and to maintain a parallel relationship between the two sections and thus prevent contact of either the wire or the sections with the shroud which surrounds the contact tip. The sections are also provided with interlocking structure to maintain the axial relationship of the sections and thus keep the expandable section from sliding forward when the welding gun is held in a vertical position. A biasing member extends around the front portion of the tip for applying a continuous biasing force to the radially movable section to resiliently urge the tongue structure against one of the flat surfaces of the wire and thereby hold the opposite flat surface of the wire against the bottom surface of the groove through a substantial length to maintain an area of contact between the wire and the adjacent surfaces of the tip substantially greater than line contact. In this manner, it is insured that the contact area between the electrode and the tip will be adequate to handle the maximum welding current without fusing the electrode to the tip.

For further objects and advantages and a more detailed understanding of the invention, reference may be had to the following description, taken in conjunction with the accompanying drawings in which:

Fig. 1 is a diagrammatic view partly in section showing a semi-automatic electric arc-welding system embodying the present invention;

Fig. 2 is a side elevational view of the improved contact tip in assembled form;

Fig. 2A is an end view of Fig. 2;

Figs. 3 and 4 are perspective views of the two sections of the contact tip;

Fig. 5 is a perspective view of the resilient means for holding the sections of the contact tip together in the manner illustrated in Fig. 2; and Fig. 6 is a modification of the resilient means shown in Fig. 5.

Referring to Fig. 1, the semi-automatic electric arc welding system 10 has been illustrated as including a hand gun 11 having a contact tip assembly 12 through which a flat wire electrode 13 is adapted to be fed by a pair of feed rolls 14. The feed rolls 14 may be contained within the gun 11, as shown in Fig. 1 or they may be disposed at a remote location from the gun, such for example as in a wire feeder and control unit 15. The wire feeder and control unit 15 may be of any suitable type and usually includes a support 16 for a roll or reel of the electrode wire 13, which is adapted to pass through a hollow flexible conduit 18 of fixed length which interconnects the wire feeder and control unit 15 with the welding gun 11. The electrode wire 13 is adapted to be fed at a predetermined speed by means of motor M contained within the wire feeder unit 15 and having a flexible drive connection indicated by the broken line 19 which connects with one of the feed rolls 14. The flexible drive connection 19 preferably is contained within a flexible hollow conductor or shield 20. A control knob 21 is provided for selecting the speed at which the wire electrode 13 is to be fed through the gun. While the wire feeder and control unit 15 has been illustrated diagrammatically as a rectangle in Fig. 1, it is to be understood that it normally includes a suitable control circuit, such for example as shown in Muller et al. Patent 2,504,868.

The work piece 25 has been illustrated as supported on a suitable work table 26, one side of which is grounded and connected by way of conductor 27 to a source of welding current, such for example as a generator 28. The other side of the work table 26 is connected by way of conductor 29 to the wire feeder and control unit 15. The welding current generator 28 also is connected to the wire feeder and control unit 15 by way of conductor 30 and to the hand gun 11 by way of a conductor 31. The trigger 33 of the hand gun 11 is adapted to close electrical contacts within the gun 11 for completing a circuit within the wire feeder and control unit 15 by way of conductors 34 and 35 as described in the aforesaid Muller et al. patent.

The system 10 includes provision for supplying an inert shielding gas, such as argon or helium, for shielding the arc. The gas is contained within a suitable cylinder 38 which is connected to the housing of the gun 11 by way of a gas line 39. The interior of the gun housing is so constructed as to cause the gas to flow around the wire electrode 13 and out through the shroud 40 which surrounds the contact tip 12, thus providing a shield of gas for the arc which is struck between the electrode 13 and the work piece 25. The gas line preferably includes a suitable pressure-reducing valve 39a, flow meter 39b and solenoid-operated valve 39c, such as that disclosed in the aforesaid Muller et al. patent.

The flat wire electrode 13 may either be rectangular in cross section or it may have an oblong cross section derived by flattening two opposite sides of a round wire so that the resulting electrode will have two flat sides and two curved sides. The oblong cross section of the electrode is preferred and it has been found that by changing round electrode wire having a diameter of .045 inch to flat electrode wire having an oblong cross section of .029 inch by .059 inch, it is possible to increase the driving area for the feed rolls 14 and the current pickup at the contact tip 12 by as much as ten times that of the point or line contact resulting from use of round wire electrodes.

To accommodate the flat wire electrode 13 of the foregoing type, the gun 11 is provided with a removable contact tip 12 which includes structural provisions for insuring that a maximum area of contact is obtained between the contact tip 12 and the electrode 13. The contact tip 12, as may be seen in Figs. 1 and 2 includes a front portion and a rear portion disposed axially of the tip, the rear portion being provided with a threaded outer surface 12a which is adapted to be received in a mating threaded surface on the main contact 41 of the gun. The rear portion of the tip 12 is provided with a central opening 42, Fig. 4, which extends axially therethrough for the passage of the flat wire electrode 13. The opening 42 may be round or oblong in cross section, as long as it is slightly larger than the electrode 13 to permit the latter to pass freely therethrough. The front portion of the contact tip 12 is divided into two sections 44 and 45, the latter being expandable with respect to section 44. As may be seen, Fig. 4, section 44, which is integral with the threaded portion 12a, has a channel or flat bottom groove 46 in its upper surface. This groove 46 extends axially of the tip from the front end thereof and is in alignment with the opening 42 in the rear portion of the tip 12. Thus, the electrode 13 is adapted to extend through the opening 42 and into the channel 46 with the bottom surface of the electrode 13 in engagement with the flat bottom of the groove 46, Fig. 2A. The rear end of the groove 46, Fig. 4, terminates in a step or shoulder 44a which is adjacent a flat portion 44b. The portion 44b lies in the same plane as the bottom of the opening 42 and the bottom of the channel 46. The purpose of the step or shoulder 44a will hereinafter be described.

The other section 45, Fig. 3, of the contact tip 12 is provided with structure for maintaining the wire electrode 13 within the groove so as to insure good contact between the electrode 13 and the tip 12. In the preferred embodiment, this structure comprises a tongue 47, Fig. 2A, which has a width slightly less than the corresponding width of the groove 46 so that the tongue 47 may enter the groove 46 and force the wire electrode 13 against the bottom of the groove. The height of the tongue is slightly greater than the depth of the groove, which is greater than the thickness of the electrode, to be sure that the electrode 13 will be held in the bottom of the groove 46 regardless of the thickness of the electrode. The upper surface of the tongue 47, Fig. 3, is in the same plane as the adjacent flat surface 45b and the forward end of the flat surface 45b terminates in a shoulder 45a which extends on opposite sides of the tongue 47. As may be seen in Fig. 2, when the sections 44 and 45 of the contact tip 12 are assembled, the mating shoulders 44a and 45a cooperate to form interlocking structure which prevents the movable section 45 of the tip 12 from sliding axially forward of the tip 12. The cylindrical outer surface of the sections 44 and 45 is, provided with a shallow groove or recessed area 44c, 45c, which is adapted to receive a resilient biasing means 50 for applying a biasing force to the movable section 45 which, in turn, by way of the tongue 47, applies the pressure to the electrode 13, thus maintaining it in good electrical contact with the bottom surface of the groove 46. In a preferred form of the invention resilient biasing means 50 comprises a ring or grommet of silicone rubber, as shown in Figs. 1, 2 and 5.

The silicone rubber has the required characteristics of providing a sufficient biasing force while at the same time being resistant to the heat encountered when in use. The silicone ring 50 has a relatively thin cross-sectional area and thus does not contact the inner surface of the shroud 40. The ring 50 has a substantial width and thus distributes the biasing force over a substantial axial length of the tip 12 so that it may be concentrated along the tongue 47 for forcing the electrode wire 13 against the bottom of the groove 46. This construction insures that the required contact area will be maintained between the electrode and the contact tip to avoid fusing of the electrode within the tip.

In another preferred form of the invention, the resilient biasing means comprises a spring member 50', Fig. 6, made from suitable material such as beryllium copper which will hold the wire electrode in compression similar to the silicone rubber member 50. The metal spring member 50' serves a dual purpose of holding the wire in compression and in addition carrying current to the top half 45 of the split contact tip 12 thereby further increasing the current pickup area.

In view of the high forward speeds employed for the electrode wire, it is necessary to insure that the electrode 13 does not wobble or come in contact with the shroud 40 which surrounds the tip 12. The tongue 47 by being adapted to extend at least partially into the groove 46 insures that the electrode 13 will be retained within the groove and not wobble regardless of how high the forward speed may be. The interlocking of the tongue 47 with the groove 46 likewise maintains the movable section 45 parallel to the axis of the section 44 of the tip 12 and thus prevents the section 45 from being twisted into contact with the shroud 40.

In consumable electrode gas-shielded arc welding, the current densities used on the consumable electrode are substantially greater than those used in conventional welding processes. Such current densities may be as high as 50,000 amperes per square inch or greater and the melting or burnoff rate of the electrode wire is governed by the welding current. The arc voltage has practically no effect on burnoff rate, but it does affect the penetration and speed of the electrode deposit. In operation, when the arc voltage decreases, the arc length will likewise decrease. Upon increase of the arc length, the arc voltage likewise increases and the electrode deposit spreads out on the work.

The feed speed of the electrode wire varies inversely with the size of the electrode wire. For example, with round wire of diameter of about .020" the wire feed speed will ordinarily be in the order of 700 to 750 inches per minute. For larger wire, such for example as wire having a diameter of 3/32", the wire feed speed will be substantially lower, in the order of about 150 to 175 inches per minute. The particular speed selected should be sufficient to cause the metal of the electrode to go across the arc in a fine spray. It is to be understood that the welding current will vary in the same direction as the feed speed. Thus with a high feed speed, there will be a high welding current and with a slower feed speed, there will be a lower welding current. In order to permit the operator to have control over the feed speed of the electrode, the feeding motor should be adjustable over a speed range of about ten-to-one at the discretion of the operator. This may be accomplished by means of the manual adjustment 21 shown in Fig. 1.

While the above feed speeds have been related to round wire, it is to be understood that such speeds are likewise applicable to the flat or flattened wire of corresponding cross-sectional area utilized in connection with the present invention. For magnesium wire electrodes, the feed speeds should be approximately fifteen to twenty percent higher than those utilized for aluminum wire electrodes.

The welding gun 11 may be cooled in conventional manner by a suitable fluid medium such, for example, as air or water by way of the inlet and outlet lines 51 and 52, shown in Fig. 1.

While the present invention has been described in connection with semi-automatic consumable electrode gas-shielded welding equipment for aluminum and magnesium, it is to be understood that it is also applicable to automatic equipment and also for the welding of ferrous materials as well as other non-ferrous materials.

In automatic arc welding, an automatic regulator controls the rate of feeding of the electrode to match the rate of melting of the metal electrode by controlling the speed of the electrode motor in response to slight changes in the arc voltage so as to maintain a practically constant average arc voltage. The rate of feed of the electrode is determined by the voltage drop between the contact tip and the electrode and this voltage drop includes the voltage drop across the arc and the voltage drop due to the contact resistance between the tip and the electrode. With the present invention, the area of contact between the tip and the electrode is large and thus the total voltage drop is essentially constant. As a result, there are no variations in the rate of feed of the welding rod attributable to variable resistance between the contact tip and the electrode, and there is a significant improvement in regulation of the length of the arc which produces better and more uniform welds.

The term flat wire is used generically in the claims and is intended to include flattened wire.

While a preferred embodiment of the invention has been described, it is to be understood that further modifications thereof may be made within the scope of the appended claims.

What is claimed is:

1. A contact tip for a welding gun comprising a front portion and a rear portion disposed axially of said tip, said rear portion having a central opening extending axially therethrough for the passage of a flat wire electrode, said front portion being divided axially thereof into two sections one of which is movable radially relative to the other, one of said sections having a groove in the surface thereof extending axially from the front end thereof and in alignment with said opening in said rear portion to receive the wire electrode, the bottom surface of said groove being flat throughout its length to engage the corresponding flat surface of the wire electrode, the other of said sections having structure dimensioned to maintain the flat wire in said groove, and means for applying a continuous biasing force to said other section to resiliently urge said structure against one of the flat surfaces of the wire and thereby maintain the opposite flat surface of the wire in engagement with said bottom surface of said groove throughout a substantial length to increase the area of contact between the wire and the adjacent surface of said tip.

2. A contact tip for a welding gun comprising a front portion and a rear portion disposed axially of said tip, said rear portion having a central opening extending axially therethrough for the passage of a flat wire electrode, said front portion being divided axially thereof into two sections, one of which is expandable relative to the other, one of said sections having a groove in the surface thereof extending axially from the front end thereof and in alignment with said opening in said rear portion to receive the wire electrode, the bottom surface of said groove being flat throughout its length to engage the corresponding flat surface of the wire electrode, the other of said sections having tongue structure dimensioned to extend into said groove and adapted to cooperate therewith to maintain the flat wire in said groove, and means for applying a continuous biasing force to said other section to resiliently urge said tongue structure against one of the flat surfaces of the wire and thereby maintain the opposite flat surface of the wire in engagement with said bottom surface of said groove throughout a substantial length to increase the area of contact between the wire and the adjacent surfaces of said tip.

3. A contact tip for a welding gun comprising a front portion and a rear portion disposed axially of said tip, said rear portion having a central opening extending axially therethrough for the passage of a flat wire electrode, said front portion being divided axially thereof into two sections, one of which is movable radially relative to the other, one of said sections having a groove in the surface thereof extending axially from the front end thereof and in alignment with said opening in said rear portion to receive the wire electrode, the bottom surface of said groove being flat throughout its length to engage the corresponding flat surface of the wire electrode, the other of said sections having structure dimensioned to cooperate with said groove to maintain the flat wire in said groove, interlocking structure on said two sections to maintain their axial relationship, and means for applying a continuous biasing force to said other section to resiliently urge said structure against one of the flat surfaces of the wire and thereby maintain the opposite flat surface of the wire in engagement with said bottom surface of said groove throughout a substantial length to increase the area of contact between the wire and the adjacent surfaces of said tip.

4. A replaceable contact tip for a welding gun comprising a front portion and a rear portion disposed axially of said tip, said rear portion having threads on the external surface thereof and an opening extending axially therethrough for the passage of a flat wire electrode, said front portion being divided axially thereof into two sections, one of which is movable radially relative to the other, one of said sections having a groove in the surface thereof extending axially from the front end thereof and in alignment with said opening in said rear portion to receive the wire electrode, the bottom surface of said groove being flat throughout its length to engage the corresponding flat surface of the wire electrode, the other of said sections having tongue structure dimensioned to extend into said groove and adapted to cooperate therewith to maintain the flat wire in said groove while maintaining a parallel relationship between said two sections, interlocking structure on said two sections to maintain their axial relationship, and means for applying a continuous biasing force to said other section to resiliently urge said tongue structure against one of the flat surfaces of the wire and thereby hold the opposite flat surface of the wire in engagement with said bottom surface of said groove throughout a substantial length to maintain an area of contact between the wire and the adjacent surfaces of said tip substantially greater than line contact.

5. A replaceable contact tip for a welding gun comprising a front portion and a rear portion disposed axially of said tip, said rear portion having an opening extending axially therethrough for the passage of a wire electrode, said front portion being divided axially thereof into two sections, one of which is movable radially relative to the other, one of said sections having a groove in the surface thereof extending axially from the front end thereof and in alignment with said opening in said rear portion to receive the wire electrode, the other of said sections having tongue structure dimensioned to extend into said groove and adapted to cooperate therewith to maintain the wire in said groove while maintaining a parallel relationship between said two sections, interlocking structure on said two sections to maintain their axial relationship, and means for applying a continuous biasing force to said other section to resiliently urge said tongue structure against one side of the wire and thereby hold the opposite side of the wire in engagement with the bottom surface of said groove throughout a substantial length to maintain an area of contact between the wire and the adjacent surfaces of said tip substantially greater than point contact.

6. In combination, a contact tip for a welding gun having a flattened wire electrode, said tip comprising a front portion and a rear portion disposed axially of said tip, said rear portion having a central opening extending axially therethrough for the passage of said flattened wire electrode, said front portion being divided axially thereof into two sections one of which is movable radially relative to the other, one of said sections having a groove in the surface thereof extending axially from the front end thereof and in alignment with said opening in said rear portion to receive said wire electrode, the bottom surface of said groove being flat throughout its length to engage the corresponding flat surface of said wire electrode, the other of said sections having structure dimensioned to maintain said wire electrode in said groove, and means for applying a continuous biasing force to said other section to resiliently urge said structure against one of the flat surfaces of said wire electrode and thereby maintain the opposite flat surface of said wire electrode in engagement with said bottom surface of said groove throughout a substantial length to increase the area of contact between said wire electrode and the adjacent surfaces of said tip.

7. A contact tip according to claim 1 wherein said means for applying a continuous biasing force comprises a ring of rubber.

8. A contact tip according to claim 1 wherein means for applying a continuous biasing force comprises a metal spring member.

References Cited in the file of this patent

UNITED STATES PATENTS

| | | |
|---|---|---|
| 2,347,646 | Smith | May 2, 1944 |
| 2,367,257 | Baird | Jan. 16, 1945 |